United States Patent
Muto et al.

(10) Patent No.: US 9,224,523 B2
(45) Date of Patent: Dec. 29, 2015

(54) INVERTER SURGE-RESISTANT INSULATED WIRE

(71) Applicants: FURUKAWA ELECTRIC CO., LTD., Tokyo (JP); FURUKAWA MAGNET WIRE CO., LTD., Tokyo (JP)

(72) Inventors: Daisuke Muto, Tokyo (JP); Hideo Fukuda, Tokyo (JP); Keiichi Tomizawa, Tokyo (JP); Satoshi Naka, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 14/500,414

(22) Filed: Sep. 29, 2014

(65) Prior Publication Data

US 2015/0021067 A1     Jan. 22, 2015

Related U.S. Application Data

(63) Continuation of application No. PCT/JP2013/079211, filed on Oct. 29, 2013.

(30) Foreign Application Priority Data

Feb. 5, 2013   (JP) ................................ 2013-020887

(51) Int. Cl.
*H01B 3/30*     (2006.01)
*H01B 7/00*     (2006.01)
(Continued)

(52) U.S. Cl.
CPC .............. *H01B 7/0283* (2013.01); *H01B 3/427* (2013.01); *H01B 13/065* (2013.01); *H02K 3/30* (2013.01); *Y02T 10/641* (2013.01)

(58) Field of Classification Search
CPC .. H01B 7/0208; H01B 7/0216; H01B 7/0275; H01B 7/0283; H01B 7/0291; H01B 13/065
USPC ............... 174/110 R, 110 SR, 119 C, 120 SR
See application file for complete search history.

(56) References Cited

U.S. PATENT DOCUMENTS

| 4,132,858 A | 1/1979 | Anderson et al. |
| 2010/0224406 A1* | 9/2010 | Setogawa et al. ........... 174/70 R |

(Continued)

FOREIGN PATENT DOCUMENTS

| CN | 102148071 A | 8/2011 |
| CN | 102782773 A | 11/2012 |

(Continued)

OTHER PUBLICATIONS

International Search Report issued in PCT/JP2013/079211, mailed on Jan. 14, 2014.

(Continued)

*Primary Examiner* — Sherman Ng
(74) *Attorney, Agent, or Firm* — Birch, Stewart, Kolasch & Birch, LLP (57) ABSTRACT

An inverter surge-resistant insulated wire, having at least one baked enamel layer around the outer periphery of a conductor, and an extrusion-coated resin layer at the outside of the baked enamel layer, wherein a total thickness of the baked enamel layer and the extrusion-coated resin layer is 50 μm or more, a thickness of the baked enamel layer is 60 μm or less, and a thickness of the extrusion-coated resin layer is 200 μm or less, wherein the minimum of tensile elastic modulus of the extrusion-coated resin layer at a range of 25 to 250° C. is 100 MPa or more, wherein a dielectric constant of an insulation layer having a combination of the baked enamel layer and the extrusion-coated resin layer is 3.5 or less at 25° C. and 5.0 or less at 250° C., and wherein a relation between dielectric constant (∈1') of the baked enamel layer at 250° C. and dielectric constant (∈2') of the extrusion-coated resin layer at 250° C. satisfies (∈2'/∈1')>1.

4 Claims, 1 Drawing Sheet

(51) Int. Cl.
    *H01B 7/02* (2006.01)
    *H01B 3/42* (2006.01)
    *H01B 13/06* (2006.01)
    *H02K 3/30* (2006.01)

(56) References Cited

U.S. PATENT DOCUMENTS

| | | | |
|---|---|---|---|
| 2011/0192632 A1* | 8/2011 | Abe et al. | 174/120 SR |
| 2011/0226508 A1* | 9/2011 | Aoi et al. | 174/120 SR |
| 2012/0241191 A1* | 9/2012 | Funayama et al. | 174/119 C |
| 2012/0285724 A1* | 11/2012 | Oya et al. | 174/120 C |
| 2013/0037304 A1* | 2/2013 | Ikeda et al. | 174/119 C |

FOREIGN PATENT DOCUMENTS

| | | | |
|---|---|---|---|
| JP | 52-087683 A | 7/1977 | |
| JP | 63-195913 A | 8/1988 | |
| JP | 6-103815 A | 4/1994 | |
| JP | 7-031944 B2 | 4/1995 | |
| JP | 7-105745 A | 4/1995 | |
| JP | 2005-203334 A | 7/2005 | |
| JP | 2010-055964 A | 3/2010 | |
| JP | 2010-123390 A | 6/2010 | |

OTHER PUBLICATIONS

Written Opinion issued in PCT/JP2013/079211, mailed on Jan. 14, 2014.

Chinese Office Action and Search Report for Chinese Application No. 201380014979.1, dated Apr. 14, 2015, with an English translation.

* cited by examiner

INVERTER SURGE-RESISTANT INSULATED WIRE

CROSS-REFERENCE TO RELATED APPLICATIONS

This application is a continuation of PCT/JP2013/079211 filed on Oct. 29, 2013, which claims priority on Japanese Patent Application No. 2013-020887 filed on Feb. 5, 2013, the subject matter of which is herein incorporated by reference.

TECHNICAL FIELD

The present invention relates to an inverter surge-resistant insulated wire.

BACKGROUND ART

Inverters have been employed in many types of electrical equipments, as an efficient variable-speed control unit. Inverters are switched at a frequency of several kHz to tens of kHz, to cause a surge voltage at every pulse thereof. Inverter surge is a phenomenon in which reflection occurs at a breakpoint of impedance, for example, at a starting end, a termination end, or the like of a connected wire in the propagation system, followed by applying a voltage twice as high as the inverter output voltage at the maximum. In particular, an output pulse occurred due to a high-speed switching device, such as an IGBT, is high in steep voltage rise. Accordingly, even if a connection cable is short, the surge voltage is high, and voltage decay due to the connection cable is also low. As a result, a voltage almost twice as high as the inverter output voltage occurs.

As coils for electrical equipments, such as inverter-related equipments, for example, high-speed switching devices, inverter motors, and transformers, insulated wires made of enameled wires are mainly used as magnet wires in the coils. Further, as described above, since a voltage almost twice as high as the inverter output voltage is applied in inverter-related equipments, it has become required to minimize the inverter surge deterioration of the enameled wire, which is one of the materials constituting the coils of those electrical equipments.

In the meantime, partial discharge deterioration is a complicated phenomenon in which an electrical-insulation material undergoes, for example, molecular chain breakage deterioration caused by collision with charged particles that have been generated by partial discharge of the insulating material, sputtering deterioration, thermal fusion or thermal decomposition deterioration caused by local temperature rise, and chemical deterioration caused by ozone generated due to discharge. For this reason, reduction in thickness, for example, is observed in the electrical-insulation materials, which have been deteriorated as a result of actual partial discharge.

It has been believed that inverter surge deterioration of an insulated wire also proceeds by the same mechanism as in the case of general partial discharge deterioration. Namely, inverter surge deterioration of an enameled wire is a phenomenon in which partial discharge occurs in the insulated wire due to the surge voltage with a high peak value, which is occurred at the inverter, and the coating of the insulated wire causes partial discharge deterioration as a result of the partial discharge; in other words, the inverter surge deterioration of an insulated wire is high-frequency partial discharge deterioration.

Insulated wires that are able to withstand several hundred volts order of surge voltage have been required for the recent electrical equipment. That is, there is a demand for insulated wires that have a partial discharge inception voltage of several hundred volts order or more. Herein, the partial discharge inception voltage is a value that is measured by a commercially available apparatus called partial discharge tester. Measurement temperature, frequency of the alternating current voltage to be used, measurement sensitivity, and the like are values that may vary as necessary, but the above-mentioned value is an effective value of the voltage at which partial discharge occurs, which is measured at 25° C., 50 Hz, and 10 pC.

When the partial discharge inception voltage is measured, a method is used in which the most severe condition possible in the case where the insulated wire is used as a magnet wire is envisaged, and a specimen shape is formed which can be observed in between two closely contacting insulated wires. For example, in the case of an insulated wire having a circular cross-section, two insulated wires are brought into linear contact by spiral twisting the wires together, and a voltage is applied between the two insulated wires. Alternatively, in the case of an insulated wire having a rectangular cross-section, use is made of a method of bringing two insulated wires into planar contact through the planes, which are the long sides of the insulated wires, and applying a voltage between the two insulated wires.

In order to obtain an insulated wire that does not cause partial discharge, that is, having a high partial discharge inception voltage, so as to prevent the deterioration of the enamel layer of the insulated wire caused by the partial discharge, it is thought to utilize a method of using a resin having a low dielectric constant in the enamel layer or increasing the thickness of the enamel layer. However, the resins of commonly used resin varnishes generally have a dielectric constant between 3 and 5, and none of the resins have particular low dielectric constant. Further, upon considering other properties (heat resistance, solvent resistance, flexibility, and the like) required from the enamel layer, it is not necessarily possible to select actually a resin having a low dielectric constant. Therefore, in order to obtain a high partial discharge inception voltage, it is indispensable to increase the thickness of the enamel layer. When the resins having a dielectric constant of 3 to 5 are used in the enamel layer, if it is intended to obtain a targeted partial discharge inception voltage of 1 kVp or higher (a high peak value), it is necessary based on the experience to set the thickness of the enamel layer at 60 μm or more.

However, to thicken the in enameled layer, the number of times for passing through a baking furnace increases in a production process thereof, whereby making a film composed of copper oxide on a copper conductor surface thicker, this in turn, causing lowering in adhesion between the conductor and the backed enamel layer. For example, in the case of obtaining an enamel layer with thickness 60 μm or more, the number of passages through the baking furnace exceeds 12 times. It has been known that if this number of passages exceeds 12 times, the adhesive force between the conductor and the enamel layer is conspicuously lowered.

It is also thought to utilize a method of increasing the thickness that can be formed by a single baking step, in order not to increase the number of passages through the baking furnace. However, this method has a drawback that the solvent of the varnish is not completely vaporized and remains in the enamel layer as voids.

Further, it has become demanded to further improve various performances, such as heat resistance, mechanical properties, chemical properties, electrical properties, and reliability, in the electrical equipments developed in recent years, as compared to the conventional electrical equipments. Under the situations, excellent insulation property at high temperature and thermal aging resistance property as well as above-mentioned high partial discharge inception voltage have become required from insulated wires, such as enameled wires, that are used as magnet wires for electrical equipments for aerospace use, electrical equipments for aircraft, electrical equipments for nuclear power, electrical equipments for energy, and electrical equipments for automobiles.

To these problems, an attempt to provide a coated resin at the outer side of the enamel wire has been made (Patent Literatures 1 and 2). However, the insulated wires described in Patent Literatures 1 and 2 also still have room to improve a partial discharge inception voltage, insulation property at a high temperature, and a thermal aging resistance property. Further, Patent Literature 3 is cited as a technique for improving the partial discharge inception voltage.

CITATION LIST

Patent Literatures

Patent Literature 1: JP-B-7-031944 ("JP-B" means examined Japanese patent publication)
Patent Literature 2: JP-A-63-195913 ("JP-A" means unexamined published Japanese patent application)
Patent Literature 3: JP-A-2005-203334

SUMMARY OF INVENTION

Technical Problem

The present invention is contemplated for providing an inverter surge-resistant insulated wire in which an insulation layer is made thick without deterioration of insulation property at a high temperature, and which has high partial discharge inception voltage and excellent thermal aging resistance property.

Solution to Problem

The present inventors, as a result of intensive studies for dissolving the above-described problems, have found that in the insulated wire provided with an extrusion-coated resin layer at the outer side of the enamel layer thereof, any of the partial discharge inception voltage, the insulation property at a high temperature, and the thermal aging resistance property can be improved by setting specific ranges for an individual thickness and a total thickness of the enamel layer and the extrusion-coated resin layer, and the minimum of tensile elastic modulus of the extrusion-coated resin layer at a range of 25 to 250° C., and further by setting specific ranges for an individual dielectric constant of an insulation layer composed of a combination of the enamel layer and the extrusion-coated resin layer at 25° C. and at 250° C., and a ratio of the specific permittivities at 250° C. The present invention has been made on a basis of this knowledge.

The above-described problems can be solved by the following means.

(1) An inverter surge-resistant insulated wire, having at least one baked enamel layer around the outer periphery of a conductor, and an extrusion-coated resin layer at the outside of the baked enamel layer,
wherein the extrusion-coated resin layer is a single layer, and a resin of the resin layer is a resin selected from polyether ether ketone, a thermoplastic polyimide, a polyamide having an aromatic ring, a polyester having an aromatic ring, and polyketone,
wherein a total thickness of the baked enamel layer and the extrusion-coated resin layer is 50 μm or more, a thickness of the baked enamel layer is 50 μm or less, and a thickness of the extrusion-coated resin layer is 200 μm or less,
wherein the minimum of tensile elastic modulus of the extrusion-coated resin layer at a range of 25 to 250° C. is 100 MPa or more and 400 MPa or less,
wherein a dielectric constant of an insulation layer having a combination of the baked enamel layer and the extrusion-coated resin layer is 3.0 or more and 3.5 or less at 25° C. and 4.0 or more and 5.0 or less at 250° C., and
wherein a relation between dielectric constant ($\in1'$) of the baked enamel layer at 250° C. and dielectric constant ($\in2'$) of the extrusion-coated resin layer at 250° C. satisfies $2.0 \geq (\in2'/\in1') > 1$.

(2) The inverter surge-resistant insulated wire as described in the above item (1), wherein the extrusion-coated resin layer is a layer formed by polyether ether ketone.

(3) The inverter surge-resistant insulated wire as described in the above item (1) or (2), wherein the conductor has a rectangular cross-section.

(4) The inverter surge-resistant insulated wire as described in any one of the above items (1) to (3), wherein the thickness of the backed enamel layer is 40 μm or less.

In this Description, the term "dielectric constant of an insulation layer" means an effective dielectric constant of an insulation layer in the inverter surge-resistant insulated wire, and further means a value calculated by the following formula from both capacitance of the inverter surge-resistant insulated wire measured by the method described below and outside diameters of the conductor and the insulated wire.

$$\in r^* = Cp \cdot \text{Log}(b/a)/(2\pi \in_0) \qquad \text{Formula:}$$

Herein, $\in r^*$ represents a dielectric constant of the insulation layer, Cp represents a capacitance per unit length [pF/m], a represents an outside diameter of the conductor, b represents an outside diameters of the insulated wire, $\in_0$ represents a vacuum permittivity ($8.855 \times 10^{-12}$ [F/m]).

Also note that in a case where the cross-section of the inverter surge-resistant insulated wire is not circular but rectangular as an example, "the dielectric constant of the insulation layer" can be calculated using a relation that capacitance Cp of the insulation layer is a sum of capacitance Cf of a flat part and capacitance Ce of a corner part (Cp=Cf+Ce). Specifically, provided that lengths of a long side and a short side of the straight-line portion of the conductor are represented by L1 and L2, respectively, a radius of curvature of the conductor corner is represented by R, and a thickness of the insulation layer is represented by T, the capacitance Cf of the flat part and the capacitance Ce of the corner part are expressed by the following formulae. Using these formulae, $\in r^*$ can be calculated from the observed capacitance of the insulated wire and capacitance Cp (Cf+Ce) of the insulation layer.

$$Cf = (\in r^*/\in_0) \times 2 \times (L1+L2)/T$$

$$Ce = (\in r^*/\in_0) \times 2\pi \in_0/\text{Log}\{(R+T)/R\}$$

Advantageous Effects of Invention

The inverter surge-resistant insulated wire of the present invention has high partial discharge inception voltage and is excellent in both insulation property at a high temperature and thermal aging resistance property.

Other and further features and advantages of the invention will appear more fully from the following description, appropriately referring to the accompanying drawings.

MODE FOR CARRYING OUT THE INVENTION

The present invention has at least one baked enamel layer around the outer periphery of a conductor, and at least one extrusion-coated resin layer at the outside thereof, and satisfies the following conditions (1) to (6):
(1) the total thickness of the baked enamel layer and the extrusion-coated resin layer is 50 μm or more;
(2) the thickness of the baked enamel layer is 60 μm or less;
(3) the thickness of the extrusion-coated resin layer is 200 μm or less;
(4) the minimum of tensile elastic modulus of the extrusion-coated resin layer at a range of 25 to 250° C. is 100 MPa or more;
(5) the effective dielectric constant of the insulation layer having a combination of the baked enamel layer and the extrusion-coated resin layer is 3.5 or less at 25° C. and 5.0 or less at 250° C.; and
(6) the relation between dielectric constant ($\in 1'$) of the baked enamel layer at 250° C. and dielectric constant ($\in 2'$) of the extrusion-coated resin layer at 250° C. satisfies ($\in 2'/\in 1'$)>1.

The inverter surge-resistant insulated wire of the present invention which has such features has high partial discharge inception voltage and is excellent in both insulation property at a high temperature and thermal aging resistance property.

Therefore, the inverter surge-resistant insulated wire of the present invention (hereinafter, referred to simply as "insulated wire") is preferably suitable for heat-resistant winding wires, and can be used for various purposes as described below.

The embodiments of an inverter surge-resistant insulated wire of the present invention will be explained, with reference to the drawings.

Figure 1:
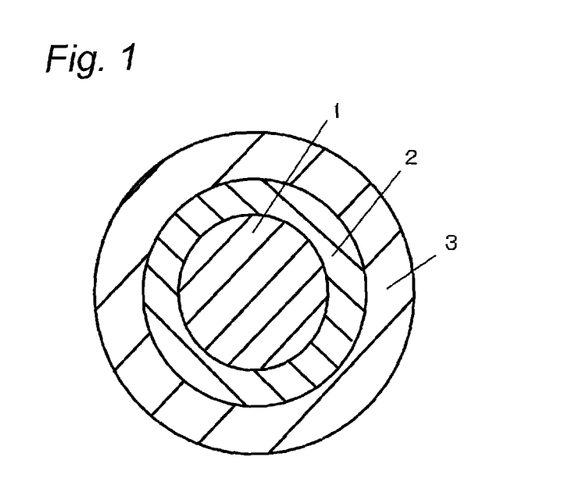
FIG. 1 is a cross-sectional view showing an embodiment of the inverter surge-resistant insulated wire of the present invention.

One embodiment of the inverter surge-resistant insulated wire of the present invention, shown in FIG. 1 has a conductor 1 having a circular cross-section, one baked enamel layer 2 covering the circumferential outer side of the conductor 1, and one extrusion-coated resin layer 3 covering the circumferential outer side of the baked enamel layer 2, and the cross-section of the entire inverter surge-resistant insulated wire has a circular shape.

Figure 2:
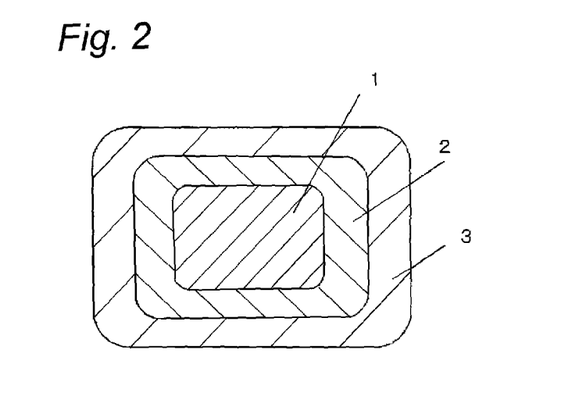
FIG. 2 is a cross-sectional view showing another embodiment of the inverter surge-resistant insulated wire of the present invention.

Another embodiment of the inverter surge-resistant insulated wire of the present invention, shown in FIG. 2 has a conductor 1 having a rectangular cross-section, one baked enamel layer 2 covering the outer periphery of the conductor 1, and one extrusion-coated resin layer 3 covering the outer periphery of the baked enamel layer 2, and the cross-section of the entire inverter surge-resistant insulated wire has a rectangular shape.

In another embodiment, a total thickness of the baked enamel layer and the extrusion-coated resin layer is enough to be at least one of the total thicknesses of the baked enamel layer and the extrusion-coated resin layer provided respectively at two sides and at the other two sides, in which the two sides are opposed to each other in the rectangular cross-section. In this embodiment, if the total thickness of the extrusion-coated resin layer and the baked enamel layer formed at the two sides in which discharge occurs is a predetermined thickness, a partial discharge inception voltage can be maintained although the total thickness of the layers formed at the other two sides is thinner than the former, and for example, a rate of the total cross-sectional area of the conductor with respect to the total cross-sectional area in a slot of the motor (space factor) can also be increased. Therefore, the total thicknesses of the extrusion-coated resin layer and the baked enamel layer provided respectively at two sides and at other two sides may be of any thickness as long as the two sides in which discharge occurs, that is to say, at least one of them is 50 μm or more, and preferably each of the two sides and the other two sides is 50 μm or more.

As for the total thickness, the two sides may be the same or different from one another and it is preferable that they are different from one another in the following manner from the standpoint of the space factor with respect to the stator slot. Specifically, the partial discharge that occurs in the stator slot such as a motor can be divided into two classes of a case where a partial discharge occurs between a slot and a wire and a case where a partial discharge occurs between a wire and a wire. As a result, a rate of the total cross-sectional area of the motor with respect to the total cross-sectional area in a slot of the motor (space factor) can be increased while maintaining the value of partial discharge inception voltage, by using an insulated wire in which the thickness of the extrusion-coated resin layer provided at a flat surface is different from the thickness of the extrusion-coated resin layer provided at an edge surface of the insulated wire.

Here, the flat surface refers to a pair of the long side of two pairs of the two sides that oppose in a rectangular cross-section of the flat wire, while the edge surface refers to a pair of the short side of two pairs of the two sides that oppose.

In a case where a discharge occurs between a slot and a wire when wires which are different from one another in terms of the thickness in the edge surface and the flat surface are arranged in a row in a slot, they are arranged so that thick film surfaces contact with each other with respect to the slot, and they are arranged so that thin film surfaces of the neighboring wires contact with each other. The thinner the film thickness is, the more the number of wires can be inserted and space factor is increased. Besides, in this time, the value of a partial discharge inception voltage can be maintained. Similarly, in a case where discharge is easy to occur between a wire and a wire, if the surface having a thick film thickness is arranged so as to be a surface to contact with a wire whereas the surface which faces the slot is made thin, the space factor is increased because a size of the slot is not increased more than necessary. Besides, in this time, the value of a partial discharge inception voltage can be maintained.

In a case where the thickness of the extrusion-coated resin layer is different between a pair of two sides which are opposed to each other and a pair of the other two sides which are opposed to each other in the cross section, when provided that the thickness of the pair of two sides which are opposed to each other is 1, the thickness of the pair of the other two sides which are opposed to each other is preferably adjusted to a range of 1.01 to 5, and more preferably adjusted to a range of 1.01 to 3.

The foregoing one preferable embodiment and another preferable embodiment (hereinafter collectively referred to as the embodiments of the present invention) are explained collectively because these are basically similar except that the shape of the cross-section of both the conductor and the inverter surge-resistant insulated wire is different from one another.

(Conductor)

As the conductor used in the insulated wires of the present invention, use may be made of any conductor that has been conventionally used in insulated wires. The conductor is a conductor of preferably a low-oxygen copper whose oxygen content is 30 ppm or less, and more preferably a low-oxygen copper whose oxygen content is 20 ppm or less or oxygen-free copper. When the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

As shown in FIG. 1 and FIG. 2, a conductor, which has a desired transverse cross-sectional shape, may be used, and in terms of space factor with respect to the stator slot, it is preferable to use a conductor having a cross-sectional shape except for a circular shape, and as shown in FIG. 2, particularly preferable to use a rectangular conductor. Furthermore, in terms of suppressing partial discharge from corners, it is preferable that chamfers (radius r) are formed at four corners.

(Baked Enamel Layer)

The baked enamel layer (hereinafter, may be referred to simply as "enamel layer") 2 is formed by an enamel resin into at least one layer which may be a single layer or a multilayer. As the enamel resin that forms the enamel layer, any of those conventionally utilized can be put to use, and examples include polyimide, polyamideimide, polyesterimide, polyetherimide, polyimide hydantoin-modified polyester, polyamide, formal, polyurethane, polyester, polyvinylformal, epoxy, and polyhydantoin. As the enamel resin, polyimide-based resins, such as polyimide, polyamideimide, polyesterimide, polyetherimide, and polyimide hydantoin-modified polyester, which are excellent in heat resistance is preferable. Of them, polyamideimide and polyimide are more preferable, and polyamideimide is particularly preferable.

As for the enamel resin for forming the enamel layer, it is preferable that the dielectric constant $\in1$ at 25° C. is small, on the standpoint that a partial discharge inception voltage can be increased. For example, the dielectric constant $\in1$ is preferably 5.0 or less, and more preferably 4.0 or less. The lower limit of the dielectric constant $\in1$ is not limited in particular, and preferably 3.0 or more in practice.

Further, as for the enamel resin, in addition to the dielectric constant $\in1$ at 25° C. which is in the above-described range, it is preferable that the dielectric constant $\in1'$ at 250° C. is 6.0 or less, and more preferably 5.0 or less, from the standpoint that excellent insulation property can be exerted even at a high temperature. The lower limit of the dielectric constant $\in1'$ is not limited in particular, and preferably 3.0 or more in practice.

The specific permittivities $\in1$ and $\in1'$ of the enamel resin can be measured at a measuring temperature of 25° C. or 250° C. respectively, using a commercially available dielectric measuring-equipment. The measuring temperature and the frequency are changed as needed; however, in the present invention, the dielectric constant means a value measured at 100 Hz, unless described otherwise.

Therefore, the enamel resin is selected from the above-described resins in consideration of the specific permittivities $\in1$ and $\in1'$ or the like. For example, as commercially available enamel resins which satisfy the specific permittivities $\in1$ and $\in1'$, it is possible to use a polyamideimide resin (PAI) varnish (manufactured by Hitachi Chemical Co., Ltd., trade name: H1406) having dielectric constant $\in1$ of 3.9 and dielectric constant $\in1'$ of 4.4, a polyimide resin (PI) varnish (manufactured by Unitika Ltd., trade name: U IMIDE) having dielectric constant $\in1$ of 3.5 and dielectric constant $\in1'$ of 4.0, and the like. The enamel resin may be used solely or in mixture of two or more kinds. Additives may be added within the above-described ranges.

From the standpoint that even if a thickness of the enamel layer is made thick whereby a high-partial discharge inception voltage can be attained, the number of passages through a baking furnace can be reduced when the enamel layer is formed, and adhesion between the conductor and the enamel layer can be prevented from being extremely lowered, and that the occurrence of the voids can be prevented, the thickness of the enamel layer is 60 μm or less, preferably 50 μm or less, more preferably 45 μm or less, and particularly preferably 40 μm or less. Further, in order to prevent deterioration of voltage resistance or heat resistance, which are properties required for the enameled wires as insulated wires, it is preferable that the enamel layer has a certain thickness. The thickness of the enamel layer is not particularly limited, as long as it is a thickness where no pinholes are formed. The thickness of the enamel layer is preferably 3 μm or more, and more preferably 6 μm or more. In another embodiment shown in FIG. 2, each of the thicknesses of the enamel layers provided respectively at two sides and at the other two sides is adjusted to 60 μm or less.

The backed enamel layer can be formed, by coating of a resin varnish containing the above-mentioned the enamel resin onto a conductor and baking of the resin varnish, each of which is preferably made several times. A method of coating the resin varnish may be a usual manner. Examples of the method include a method using a die for coating varnish, which has a shape similar to the shape of a conductor, or a method using a die called "universal die" that is formed in the shape of a curb when the conductor has a quadrangular cross-section. The conductor to which the resin varnish is coated is baked in a baking furnace in a usual manner. Specific baking conditions depend on the shape of the furnace to be used. In the case of using a natural convection-type vertical furnace with length approximately 5 m, baking may be achieved by setting a transit time of 10 to 90 sec at 400 to 500° C.

(Extrusion-Coated Resin Layer)

In order to obtain an insulated wire having a high partial discharge inception voltage, at least one extrusion-coated resin layer is provided around the outer side of the baked enamel layer. The extrusion-coated resin layer may be a single layer or multilayers.

Further in the present invention, in a case where the extrusion-coated resin layer is composed of multilayers, it is preferable that the same resin among the multilayers is used. Specifically, layers formed by the same resin as the resin contained in the extrusion-coated resin layer nearest the enamel layer side are laminated. Here, the presence or absence of additives other than the resin, and the kind or the compounding amount thereof may be different from one another among the multilayers, as long as the resin is the same. In the present invention, the extrusion-coated resin layer is preferably a single layer or double layers, and a single layer is particularly preferable.

Herein, the single layer means that even in a case where layers in which resins forming the layers and additives contained therein are the same in each of the layers, are laminated, these layers are regarded as the same layer, and on the other hand, even in a case that the layers are composed of the same resins, when compositions constituting the layers are different from one another such that, for example, a kind of additives or a compounding amount is different from one another, the number of the layers are counted.

This definition is also applied to layers other than the extrusion-coated resin layer.

The extrusion-coated resin layer is a layer of a thermoplastic resin. Examples of the thermoplastic resin for forming the extrusion-coated resin layer include polyether ether ketone (PEEK). Here, the polyether ether ketone means inclusion of modified polyether ether ketone (modified-PEEK). The modified polyether ether ketone is polyether ether ketone denatured by adding thereto an auxiliary agent or a resin which is used for improving mechanical properties or thermal properties. Examples of the foregoing modified polyether ether ketone include products under the trade name "AvaSpire" series, specifically "AvaSpire AV-650" (trade name, manufactured by Solvay Specialty Polymers).

Furthermore, Examples of thermoplastic resin include thermoplastic polyimide (PI), aromatic polyamide having aromatic ring (referred as aromatic polyamide), polyester having aromatic ring (referred as aromatic polyester), polyketone (PK), and polyethylene naphtalate (PEN).

In the extrusion-coated resin layer, among them, polyether ether ketone (PEEK include modified polyether ether ketone), thermoplastic polyimide (PI), aromatic polyamide having aromatic ring (referred as aromatic polyamide), polyester having aromatic ring (referred as aromatic polyester), polyketone (PK), or polyetylene naphtalate (PEN) is preferable, polyether ether ketone (PEEK include modified polyether ether ketone), or polyetylene naphtalate (PEN) is more preferable, polyether ether ketone (PEEK include modified polyether ether ketone) is further more preferable, polyether ether ketone not including modified polyether ether ketone (PEEK) is particularly preferable.

The extrusion-coated resin for forming the extrusion-coated resin layer may be an extrusion-moldable thermoplastic resin. As for the extrusion-coated resin, it is preferable that the dielectric constant $\in 2$ at 25° C. is small, on the standpoint that a partial discharge inception voltage can be increased. For example, the dielectric constant $\in 2$ is preferably 5.0 or less, and more preferably 4.0 or less. The lower limit of the dielectric constant $\in 2$ is not limited in particular, and preferably 2.0 or more in practice.

Further, as for the thermoplastic resin, in addition to the dielectric constant $\in 2$ at 25° C. which is in the above-described range, it is preferable that the dielectric constant $\in 2'$ at 250° C. is 6.0 or less, and more preferably 5.0 or less, from the standpoint that excellent insulation property can be exerted even at a high temperature. The lower limit of the dielectric constant $\in 2'$ is not limited in particular, and preferably 2.0 or more in practice.

The specific permittivities $\in 2$ and $\in 2'$ of the enamel resin can be measured at a measuring temperature of 25° C. or 250° C. respectively, using a commercially available dielectric measuring-equipment. The measuring temperature and the frequency are changed as needed; however, in the present invention, the dielectric constant means a value measured at 100 Hz, unless described otherwise.

On the standpoint that the extrusion-coated resin layer, more specifically the thermoplastic resin for forming the extrusion-coated resin layer is able to exert excellent mechanical properties under the conditions ranging from low temperature like room temperature to a high temperature, and excellent insulation property at a high temperature, it is preferable that the minimum of the tensile elastic modulus in the temperature range of 25 to 250° C. is 100 MPa or more, and the minimum of the tensile elastic modulus even in the temperature range of from more than 250° C. to 280° C. or less is maintained to be 100 MPa or more. Thus, tensile elastic modulus of the thermoplastic resin is 100 MPa or more in the temperature range of 25° C. to 250° C., and more preferably in the temperature range of 25° C. to 280° C. The minimum of the tensile elastic modulus is preferably 200 MPa or more, and more preferably 300 MPa or more, and the upper limit (maximum) thereof is not limited in particular, and preferably 400 MPa in practice. The tensile elastic modulus can be adjusted by degree of cross-linkage of the thermoplastic resin, crystallinity, and the like.

The tensile elastic modulus can be measured by dynamic viscoelasticity measurement (DMS). Specifically, measurement is carried out continuously or intermittently in a temperature range of 25° C. to 280° C., by using a tensile mode, frequency of 10 Hz and strain amount of $\frac{1}{1000}$, while changing a measuring temperature at an elevating rate of 5° C./min. The control mode at the time of measurement, the frequency, the strain amount, the measuring temperature and the like is changeable, if needed.

In a case where the thermoplastic resin is a crystalline thermoplastic resin, enhancement of crystallinity of the film is preferable on the standpoint that a rapid decline in the tensile elastic modulus in the vicinity of a glass transition temperature can be suppressed, and both excellent mechanical properties under the conditions of from a low temperature to a high temperature and excellent insulation properties at a high temperature can be exerted. Specifically, the crystallinity of the film is preferably 50% or more, more preferably 70% or more, and particularly preferably 80% or more. The upper limit of the crystallinity is not limited in particularly, and for example it is 100%. The film crystallinity of the extrusion-coated resin layer can be measured using differential scanning calorimetry (DSC). Specifically, an adequate amount of a film of the extrusion-coated resin layer is weighed and temperature thereof is elevated at the rate of 5° C./min. During this stage, a heat amount (melting heat amount) due to melting that is observed at the region more than 300° C. and a heat amount (crystallization heat amount) due to crystallization that is observed at round 150° C. are calculated and a difference of the heat amount in which the crystallization heat amount is deducted from the melting heat amount, with respect to the melting heat amount is defined as the film crystallinity. This calculation formula is shown below.

Calculation formula: the film crystallinity(%)=[(the melting heat amount−the crystallization heat amount)/(the melting heat amount)]×100

Further, on the standpoint that the thermal aging resistance is improved much more, a melting point of the thermoplastic resin for forming the extrusion-coated resin layer is preferably 260° C. or more, more preferably 280° C. or more, and particularly preferably 330° C. or more. The melting point of the thermoplastic resin is, for example, preferably 370° C. or less, and more preferably 360° C. or less. The melting point of the thermoplastic resin can be measured by the method described below using differential scanning calorimetry (DSC). Specifically, temperature of 10 mg of the extrusion-coated resin layer is elevated at the rate of 5° C./min using thermal analysis equipment "DSC-60" (manufactured by Shimadzu Corporation), and during this stage, a peak temperature of the heat amount due to melting that is observed at the region more than 250° C. is read and defines as a melting point. Also note that when there is a plurality of peak temperatures, the peak temperature of higher temperature is defined as a melting point.

The thermoplastic resin for forming the extrusion-coated resin layer is selected from the above-described thermoplastic resin by considering the dielectric constant $\in$2 at 25° C., the dielectric constant $\in$2' at 250° C., the minimum of tensile elastic modulus in a range of 25 to 250° C., and if needed, the melting point or the like. In particular, preferred are thermoplastic resins in which the individual thickness and the total thickness of the enamel layer and the extrusion-coated resin layer, the specific permittivities of the insulation layer at 25° C. and at 250° C., the ratio of the above-described specific permittivities, and the minimum of tensile elastic modulus in a range of 25 to 250° C. each fall within the above-described ranges; for example, preferred are at least one of thermoplastic resins selected from the group consisting of polyether ether ketone and a modified polyether ether ketone. That is, the extrusion-coated resin layer is preferably a polyether ether ketone-based layer. If these thermoplastic resins is used as the thermoplastic resin for forming the extrusion-coated resin layer, a partial discharge inception voltage is improved much more, both a mechanical property under the conditions of from a low temperature to a high temperature and an insulation property at a high temperature are also maintained at a high level, and in addition a thermal aging resistance property is also improved much more, by combined with the above-described individual thickness, total thickness and specific permittivities, the above-described specific permittivities and ratio of the minimum of tensile elastic modulus in a range of 25 to 250° C. As these thermoplastic resins, it is possible to use, for example, polyether ether ketone (PEEK) having dielectric constant $\in$2 of 3.1 and dielectric constant $\in$2' of 4.7 (manufactured by Solvay Specialty Polymers, trade name: "KetaSpire KT-820") and the like.

The thermoplastic resin for forming the extrusion-coated resin layer may be used singly alone, or two or more kinds thereof. Also note that the thermoplastic resin may be blended with other resins, elastomers or the like, if not extended beyond the above-described range or the range described below of the minimum of tensile elastic modulus in a range of 25 to 250° C. and the specific permittivities.

The thickness of the extrusion-coated resin layer is less than 200 μm, and the thickness of less than 180 μm is preferable. If the thickness of the extrusion-coated resin layer is too thick, when an insulated wire is wound around an iron core and heated, a whitened portion is sometimes formed on the insulated wire surface. As just described, if the extrusion-coated resin layer is too thick, flexibility suitable for an insulated wire becomes poor because the extrusion-coated resin layer itself has stiffness, and as a result, the poor flexibility sometimes has an effect on a change of the electrical insulation keeping property before and after the working. On the other hand, the thickness of the extrusion-coated resin layer is preferably 5 μm or more, and more preferably 15 μm or more, from the standpoint that insulation failure can be prevented. In above-mentioned another embodiment, each of the thicknesses of the extrusion-coated resin layers provided respectively at two sides and at the other two sides is adjusted to 200 μm or less.

The extrusion-coated resin layer can be formed by extrusion-molding the above-described thermoplastic resin on an enamel layer having been formed on a conductor. The conditions at the time of extrusion-molding, for example, a condition of extrusion temperature are set appropriately according to the thermoplastic resin to be used. Taking an example of preferable extrusion temperatures, specifically the extrusion temperature is set at a temperature higher by 30° C. than the melting point, preferably about 40° C. to 60° C. than the melting point in order to achieve a melt viscosity suitable for the extrusion-coating. If the extrusion-coated resin layer is formed by the extrusion-molding as just described, there is no need to pass it through a baking furnace at the time of forming a coated resin layer in the production process. As a result, there is an advantage that a thickness of an insulation layer, namely the extrusion-coated resin layer can be made thick without growing the thickness of an oxidation-coated layer of the conductor.

In the preferable embodiments, a total thickness of the enamel layer and the extrusion-coated resin layer is 50 μm or more. If the total thickness is 50 μm or more, the partial discharge inception voltage of the insulated wire becomes 1 kVp or more, thereby being able to prevent the inverter surge deterioration. This total thickness is preferably 75 μm or more, and more preferably 100 μm or more from the standpoint that this allows development of higher partial discharge inception voltage and a high level of prevention of inverter surge deterioration. In another embodiment described above, the total thicknesses of the baked enamel layer and the extrusion-coated resin layer provided respectively at two sides and at the other two sides are each 50 μm or more. Thus, if a thickness of the enamel layer is adjusted to 60 μm or less, a thickness of the extrusion-coated resin layer is adjusted to 200 μm or less, and a total thickness of the enamel layer and the extrusion-coated resin layer is adjusted to 50 μm or more, at least a partial discharge inception voltage of the insulated wire, that is, prevention of inverter surge deterioration, adhesive strength between the conductor and the enamel layer, and suppression of foaming during making of the enamel layer can be satisfied. Also note that the total thickness of the baked enamel layer and the extrusion-coated resin layer is preferably 260 μm or less, and preferably 200 μm or less in order that working can be done keeping out of trouble in view of the properties of insulation retention before and after coil-working (hereinafter, referred to as insulation retention properties before and after working).

Therefore, in the insulated wire of the embodiments of the present invention, a conductor and an enamel layer adhere to each other with a strong adhesive strength. The adhesive strength between the conductor and the enamel layer can be evaluated, for example, in terms of rotation frequency until occurring of the float of the enamel layer, in accordance with the same way as described in the JIS C 3003 Methods of test for enamel wires, Section 8. Adhesiveness, 8.1 b) Torsion methods. Also for the rectangular wire having a square-shaped cross-section, evaluation can be carried out similarly. In the present invention, those in which the rotation frequency until float of the enamel layer occurs is 15 rounds or more is judged as being good in terms of adhesiveness, and the insulated wire according to this preferable embodiment achieves 15 rounds or more of rotation frequency.

In the embodiments of the present invention, the dielectric constant of the entire insulation layer having a combination of the baked enamel layer and the extrusion-coated resin layer is 3.5 or less at 25° C. If the dielectric constant is 3.5 or less, at least a partial discharge inception voltage of the insulated wire at 25° C. can be improved to 1 kVp or more whereby inverter surge deterioration can be prevented. The dielectric constant at 25° C. is preferably 3.2 or less on the standpoint that the inverter surge deterioration can be prevented still more. The lower limit is not limited in particular; and, preferably 3.0 or more in practice.

Further, the dielectric constant of the entire insulation layer having a combination of the baked enamel layer and the extrusion-coated resin layer is 5.0 or less at 250° C. Generally, the permittivity of the resin increases at high temperature, and the partial discharge inception voltage naturally reduces in association with reduction in density of air. However, if the dielectric constant is 5.0 or less at 250° C., reduction of the partial discharge inception voltage at a high temperature, for example, at 250° C. can be suppressed. The dielectric constant at 250° C. is preferably 4.8 or less on the standpoint that reduction of the partial discharge inception voltage can be prevented still more. The lower limit is not limited in particular; and, preferably 4.0 or more in practice.

The specific permittivities of the entire insulation layer at 25° C. and at 250° C. can be adjusted to the above-described ranges by selecting specific permittivities ∈1 and ∈1' and a thickness of the enamel resin for forming the enamel layer, and specific permittivities ∈2 and ∈2' and a thickness of the thermoplastic resin for forming the extrusion-coated resin layer. For example, if the enamel resin having small specific permittivities ∈1 and ∈1' and/or the thermoplastic resin having small specific permittivities ∈2 and ∈2' are selected, the dielectric constant of the entire insulation layer can be made small. Further, if the resin having smaller dielectric constant is coated thicker, the dielectric constant of the entire insulation layer can be made small.

The dielectric constant of the entire insulation layers can be calculated by formula as described above from both capacitance of the inverter surge-resistant insulated wire measured by the method described below and outside diameters of the conductor and the insulated wire.

By using both a LCR HITESTER (Model 3532-50 (trade name: LCR HITESTER) manufactured by HIOKI E.E. CORPORATION) and an insulated wire left for 24 hours in a dry air at ordinary temperature (25° C.), and setting a measuring temperature to 25° C. and 250° C., and putting the insulated wire into a thermostat bath having been set to a predetermined temperature, and then measurement of capacitance is carried out at the time when the temperature has become constant.

In the embodiments of the present invention, a relation between dielectric constant ∈1' of the enamel layer at 250° C. and dielectric constant ∈2' of the extrusion-coated resin layer at 250° C. satisfies ∈2/∈1'>1. Generally, the thermoplastic resin for forming the extrusion-coated resin layer is inferior in terms of insulation property at a high temperature in particular, when compared to the enamel resin for forming the enamel layer. However, if the enamel resin and the extrusion-coated resin layer satisfy the foregoing relation, an electric field of the extrusion-coated resin layer can be reduced and this allows dielectric breakdown voltage to be well maintained, which is an insulation property of the entire insulation layer at a high temperature, for example, at a high temperature at 250° C. This relation of the specific permittivities ∈2∈/∈1' is preferably more than 1.0 and 2.0 or less, and more preferably 1.1 or more and 1.5 or less.

The dielectric breakdown voltage of the insulated wire can be measured by, as described below, winding a metal foil on the insulated wire and applying an alternating-current voltage which is near a sine wave of 50 Hz between the conductor and the metal foil. In a case of measuring temperature property, the insulated wire is put into a thermostat bath having been set to a predetermined temperature, and then temperature property is measured in the same manner as described above.

The insulated wires according to the embodiments of the present invention which have the above-described construction are also excellent in thermal aging resistance property which is required for recent insulated wires. The thermal aging resistance property becomes an indicator for ensuring such a long-term reliability that insulation property is not reduced for a long time although it is used in a high-temperature environment. For example, evaluation can be carried out by visually confirming existence or non-existence of cracks which are caused in an enamel layer or an extrusion-coated resin layer after still standing of a wound specimen for 1000 hours in a 190° C. high-temperature bath in accordance with JIS C 3003 Method of test for enamel wires, Section 7.Flexibility. In the present invention, the thermal aging resistance property is evaluated as being excellent, in a case where no crack is observed in any of the enamel layer and the extrusion-coated resin layer, which results in no abnormality.

In the above-described embodiments of the present invention, the extrusion-coated resin layer is formed around the outer periphery of the enamel layer without mediation of any other layer. In the embodiments of the present invention, however, an adhesive layer may be provided between the enamel layer and the extrusion-coated resin layer. If the adhesive layer is provided between the enamel layer and the extrusion-coated resin layer, an adhesive strength between the enamel layer and the extrusion-coated resin layer is enhanced, and thereby much higher partial discharge inception voltage can be exerted and inverter surge deterioration can be prevented effectively. That is, when the adhesive force between the extrusion-coated resin layer and the enamel layer is not sufficient, wrinkles of the extrusion-coated resin layer may occur in some cases, on the inner portion of an arc of the wire bent, under a severe working condition, for example, when the wire is bent at a small radius. When the wrinkles occur, a space occurs between the enamel layer and the extrusion-coated resin layer, which may result in a phenomenon of lowering of a partial discharge inception voltage in some cases. However, if the adhesive layer has been provided, occurrence of the wrinkles in the extrusion-coated resin layer can be prevented and thereby the partial discharge inception voltage can be maintained.

The adhesive layer is a layer made by a thermoplastic resin, and is not included in an entire insulation layer having a combination of an enamel layer and an extrusion-coated resin layer. More specifically, "dielectric constant of the insulation layer" means a dielectric constant of the insulation layer composed of the enamel layer and the extrusion-coated resin layer excepting the adhesive layer.

As for the thermoplastic resin which forms the adhesive layer, any kind of resins may be used as long as they are a resin which is capable of heat-sealing an extrusion-coated resin layer to an enamel layer. It is preferable that these resins are non-crystalline resins which are easily soluble in a solvent, in view of the necessity to make them a varnish. Further, it is preferable that these are resins which are also excellent in heat resistance in order to prevent from reduction in heat resistance required for the insulated wire. In view of these points, examples of preferable thermoplastic resins include polysulfone (PSU), polyether sulfone (PES), polyether imide (PEI), polyphenyl sulfone (PPSU), and the like. Among these, polysulfone (PSU), polyether sulfone (PES), polyether imide (PEI), and polyphenyl sulfone (PPSU) are more preferable. In particular, preferred is polyetherimide (PEI) which has good compatibility with a thermoplastic resin for forming the extrusion-coated resin layer and has excellent thermal resistance property. Also note that the varnish-making solvent is not particularly limited, as long as it is able to dissolve the selected thermoplastic resin.

The thickness of the adhesive layer is preferably 2 to 20 μm, more preferably 3 to 15 μm, and further more preferably 3 to 10 μm.

Further, the adhesive layer may have a laminate structure composed of two or more layers. In this case, however, it is preferable that a resin in each layer is the same with respect to one another. In the present invention, the adhesive layer is preferably a single layer.

The adhesive layer can be formed by coating a varnish of the above-described thermoplastic resin on an enamel layer having been formed on a conductor, and baking it. At this time, in order to heat-seal sufficiently the adhesive layer and an extrusion-coated resin layer, a heating temperature of the thermoplastic resin for forming the extrusion-coated resin layer in the extrusion-coating process is preferably a glass transfer temperature (Tg) or more of the resin to be used for the adhesive layer, more preferably a temperature higher by 30° C. or more than the Tg, and particularly preferably a temperature higher by 50° C. or more than the Tg. Here, the heating temperature of the thermoplastic resin for forming the extrusion-coated resin layer means a temperature of the die section.

EXAMPLES

The present invention is described in more detail based on examples given below, but the present invention is not limited by the following examples. That is, the present invention is not construed to be limited by the above-mentioned embodiments and the following examples, and various modifications can be made within the scope of the technical matter of the present invention.

Example 1

A rectangular conductor (copper of oxygen content 15 ppm) was provided, which had a dimension of 1.8 mm×3.4 mm (thickness×width) and a chamfer radius r of 0.3 mm at four corners. In forming an enamel layer, the conductor was coated with a polyamideimide resin (PAI) varnish (manufactured by Hitachi Chemical Co., Ltd., trade name: HI406, dielectric constant ∈1: 3.9), by using a die with a shape similar to the shape of the conductor, followed by passing through an 8 m-long baking furnace set to 450° C., at a speed so that the baking time period would be 15 sec, thereby to form an enamel of thickness 5 μm, via this one step of baking. This step was repeated, to form an enamel layer with thickness 25 μm, thereby to obtain an enameled wire with the coating thickness of 25 μm.

The obtained enamel wire was used as a core wire, and a screw of the extruder having 30 mm fullflight, L/D=20, and compression ratio=3 was used. As the material, polyether ether ketone (PEEK) (manufactured by Solvay Specialty Polymers, trade name: KETASPAIRE KT-820, dielectric constant ∈2: 3.1, melting point: 343° C.) was used. Extrusion was carried out under the conditions of extrusion temperature shown in Table 1. Extrusion coating of PEEK was carrying out using an extruding die, to form a 26 μm-thick extrusion-coated resin layer (the minimum of tensile elastic modulus at a range of 25 to 250° C. and the crystallinity measured by the above-described measuring method are shown in Table 2) around the outer side of the enamel layer. Thus, an insulated wire composed of the PEEK extrusion-coated enamel wire having a total thickness (a total of thicknesses of the enamel layer and the extrusion-coated resin layer) of 51 μm was obtained.

Examples 2 to 4 and Comparative Examples 3 and 4

Each of insulated wires composed of the PEEK extrusion-coated enamel wire was obtained in the same manner as in Example 1, except that the thickness of the enamel layer and the extrusion-coated layer were changed to those shown in the following Tables 2 to 4. The minimum of tensile elastic modulus at a range of 25 to 250° C. and the crystallinity measured by the above-described measuring method, of each of the extrusion-coated resin layers, are shown in Table 2. Extrusion was carried out under the conditions of extrusion temperature shown in Table 1.

Example 5

An insulated wire composed of the PEEK extrusion-coated enamel wire was obtained in the same manner as in Example 1, except that polyimide (PI) resin varnish (manufactured by UNITIKA Limited., trade name: U imide, dielectric constant ∈1: 3.5) was used instead of the polyamideimide resin varnish as the enamel resin, and the thickness of the enamel layer and the extrusion-coated layer were changed to those shown in the following Table 2. The minimum of tensile elastic modulus at a range of 25 to 250° C. and the crystallinity measured by the above-described measuring method, of the extrusion-coated resin layer, are shown in Table 2. Extrusion was carried out under the conditions of extrusion temperature shown in Table 1.

Example 6

An insulated wire composed of the modified PEEK extrusion-coated enamel wire was obtained in the same manner as in Example 1, except that modified polyether ether ketone (modified-PEEK) (manufactured by Solvay Specialty Polymers, trade name: AvaSpire AV-650, dielectric constant ∈2: 3.1, melting point: 340° C.) was used instead of the polyether ether ketone as the extrusion-coated resin, and the thickness of the enamel layer and the extrusion-coated layer were changed to those shown in the following Table 2. The minimum of tensile elastic modulus at a range of 25 to 250° C. and the crystallinity measured by the above-described measuring method, of the extrusion-coated resin layer, are shown in Table 2. Extrusion was carried out under the conditions of extrusion temperature shown in Table 1.

Example 7

An insulated wire composed of the PEN extrusion-coated enamel wire was obtained in the same manner as in Example 5, except that polyethylene naphtalate (PEN) (manufactured by Teijin Ltd., trade name: Teonex TN8065S, dielectric constant ∈2: 3.5, melting point: 265° C.) was used instead of the polyether ether ketone as the extrusion-coated resin, and the thickness of the enamel layer and the extrusion-coated layer were changed to those shown in the following Table 2. The minimum of tensile elastic modulus at a range of 25 to 250° C. and the crystallinity measured by the above-described measuring method, of the extrusion-coated resin layer, are shown in Table 2. Extrusion was carried out under the conditions of extrusion temperature shown in Table 1.

Examples 8 to 10

Each an insulated wire having a PEEK extrusion-coated enamel wire was obtained in the same manner as in Examples 2, 3, and 4, respectively, except that an adhesive layer was provided between the enamel layer and the extrusion-coated resin layer. As for the adhesive layer, a resin varnish in which a polyetherimide resin (PEI) (manufactured by SABIC Innovative Plastics, trade name: ULTEM 1010) had been dissolved in N-methyl-2-pyrrolidone (NMP) so as to be a 20-wt % solution was coated around the circumferential outer side of the foregoing enamel layer, by using a die with a shape similar to the shape of the conductor, and then passing it through a baking furnace at the same conditions as the enamel layer. By repeating once or twice the foregoing coating process, a 3 μm or 6 μm-thick adhesive layer was formed (the thickness formed by one baking process was 3 μm). The minimum of tensile elastic modulus at a range of 25 to 250° C. and the crystallinity measured by the above-described measuring method, of each of the extrusion-coated resin layers, are shown in Table 3. Extrusion was carried out under the conditions of extrusion temperature shown in Table 1.

Comparative Example 1

An insulated wire composed of the PEEK extrusion-coated enamel wire was obtained in the same manner as in Example 1, except that the thickness of the extrusion-coated layer was changed to that shown in the following Table 4. The minimum of tensile elastic modulus at a range of 25 to 250° C. and the crystallinity measured by the above-described measuring method, of the extrusion-coated resin layer, are shown in Table 4. Extrusion was carried out under the conditions of extrusion temperature shown in Table 1.

Comparative Example 2

An insulated wire composed of the PA66 extrusion-coated enamel wire was obtained in the same manner as in Example 1, except that polyamide 66 (PA66) (manufactured by Asahi Kasei Corporation., trade name: REONA 1402, dielectric constant ∈2: 11, melting point: 265° C.) was used instead of the PEEK as the extrusion-coated resin, and the thickness of the extrusion-coated layer was changed to that shown in the following Table 4. The minimum of tensile elastic modulus at a range of 25 to 250° C. and the crystallinity measured by the above-described measuring method, of the extrusion-coated resin layer, are shown in Table 4. Extrusion was carried out under the conditions of extrusion temperature shown in Table 1.

Comparative Examples 5 and 6

Each an insulated wire composed of the PPS extrusion-coated enamel wire was obtained in the same manner as in Example 1, except that polyphenylenesulfide (PPS) (manufactured by DIC Corporation, trade name: FZ-2100, dielectric constant ∈2: 3.2, melting point: 277° C.) was used instead of the PEEK as the extrusion-coated resin, and the thickness of the enamel layer and the extrusion-coated layer were changed to those shown in the following Table 4. The minimum of tensile elastic modulus at a range of 25 to 250° C. and the crystallinity measured by the above-described measuring method, of each of the extrusion-coated resin layer, are shown in Table 4. Extrusion was carried out under the conditions of extrusion temperature shown in Table 1.

Reference Example 1

An insulated wire composed of a PEEK extrusion-coated wire was obtained in the same manner as in Example 1, except that the extrusion-coated resin wire having the thickness shown in Table 4 was provided directly on the conductor without providing any enamel layer. The minimum of tensile elastic modulus at a range of 25 to 250° C. and the crystallinity measured by the above-described measuring method, of the extrusion-coated resin layer, are shown in Table 4. Extrusion was carried out under the conditions of extrusion temperature shown in Table 1.

(The Conditions of Extrusion Temperature)

The conditions of extrusion temperature of Examples 1-10, Comparative Examples 1-6, and Reference Example 1 are shown in the Tables 1, respectively.

In Table 1, C1, C2 and C3 indicate 3 zones in which temperature control in the cylinder portion of the extruder is carried out in parts, in this order from the input side of materials. Further, H indicates a head located posterior to the cylinder of the extruder. Further, D indicates a die at the end of the head.

TABLE 1

| Extrusion-coated resin | | PEEK | Modified-PEEK | PA66 | PPS | PEN |
|---|---|---|---|---|---|---|
| The conditions of extrusion temperature | C1 (° C.) | 300 | 300 | 270 | 260 | 270 |
| | C2 (° C.) | 380 | 380 | 280 | 300 | 280 |
| | C3 (° C.) | 380 | 380 | 290 | 310 | 290 |
| | H (° C.) | 390 | 390 | 300 | 320 | 300 |
| | D (° C.) | 400 | 400 | 300 | 330 | 300 |

Evaluations of the thus-produced insulated wires of Examples 1-10, Comparative Examples 1-6, and Reference Example 1 were carried out as follows. These results are shown in the following Tables 2 to 4.

(Specific Permittivity)

The dielectric constant was calculated in accordance with substituting the capacitance of the wire measured and the outside diameters of the conductor and the insulated wire into the above-mentioned formula.

(Partial Discharge-Occurring Voltage)

The partial discharge inception voltage was measured, using a partial discharge tester "KPD2050" (trade name), manufactured by Kikusui Electronics Corp. Two pieces of the respective insulated wire with a rectangular cross-section were brought into close contact with each other with plane contact at the planes of the long sides without any space therebetween over a length of 150 mm, thereby to produce a sample. Measurement was carried out by applying an alternating-current voltage of 50 Hz sine wave between these two conductors. Elevation of voltage was controlled at a constant speed in a rate of 50V/sec, and the voltage at the time when 10 pC of partial discharge occurred was read. A measuring temperature was set to 25° C. and 250° C. Then, the insulated wire was put into a thermostat bath having been set to the predetermined temperature, and at the time when the temperature became constant, measurement was carried out. A sample in which the measured value was 1 kVp (a high peak value) or more at the measuring temperature of 25° C. was judged to have met the passing level for the test criteria, and expressed as "○". In contrast, a sample in which the measured value was less than 1 kVp (a high peak value) was judged to be failed to reach the passing level for the test criteria, and expressed as "x". Further, a sample in which the measured value at the measuring temperature of 250° C. was retained at a rate of 50% or more with respect to the measured value at the measuring temperature of 25° C. was judged to have met the passing level for the test criteria, and expressed as "○". In contrast, a sample in which the retention rate was less than 50% with respect to the measured value at 25° C. was judged to be failed to reach the passing level for the test criteria, and expressed as "x". Also note that "ND" in Table 4 means "not measured".

(Dielectric Breakdown Voltage)

The dielectric breakdown voltage was measured by winding a metal foil on an insulated wire and applying an alternating-current voltage of 50 Hz sine wave between a conductor and the metal foil. Elevation of voltage was controlled at a constant speed in a rate of 500V/sec, and detection sensitivity was set to 5 mA and an applied voltage at the time when an electric current flowed more was measured in terms of an effective value. A measuring temperature was set to 25° C. and 250° C. Then, the insulated wire was put into a thermostat bath having been set to the predetermined temperature, and at the time when the temperature became constant, measurement was carried out. A sample in which the dielectric breakdown voltage at the measuring temperature of 250° C. was able to be retained at a rate of 50% or more with respect to the dielectric breakdown voltage at the measuring temperature of 25° C. was judged to have met the passing level for the test criteria, and expressed as "○". In contrast, a sample in which the retention rate was less than 50% with respect to the dielectric breakdown voltage at 25° C. was judged to be failed to reach the passing level for the test criteria, and expressed as "x". Also note that "ND" in Table 4 means "not measured".

(Dielectric Breakdown Test after Winding on Iron Core and Heating)

Evaluation of the electrical insulation keeping property before and after working was carried out as follows: that is, the electrical wire was wound on an iron core having a diameter of 30 mm and hold for 30 minutes in a thermostat bath in which temperature is elevated to 250° C. After taking it from the thermostat bath, existence or non-existence of cracks or discoloration in the extrusion-coated layer was visually checked. Tests have confirmed that unless cracks and discoloration can be confirmed in the extrusion-coated layer, dielectric breakdown does not occur although conduction to the wire having been taken from the thermostat bath is permitted at the voltage of 3 kV for 1 minute. Regarding evaluation of the dielectric breakdown test after winding on iron core and heating, a sample in which troubles such as cracks, change of shape and discoloration were not able to be confirmed in the wire having been taken from the thermostat bath, was judged to have met the passing level for the test criteria. Based on this criteria, a sample in which property is excellent in particular because there is none of cracks, change of shape and discoloration was expressed as "⊙". A sample in which performance is excellent because none of cracks and change of shape was found although discoloration was slightly found was expressed as "○". A sample in which the trouble was confirmed was judged to be failed to reach the passing level for the test criteria, and expressed as "x". Also note that "ND" in Table 4 means "not measured".

(Thermal Aging Resistance Property (190° C.))

Thermal aging resistance property of the insulated wire was evaluated as follows. A wound specimen was put into a high-temperature bath having been set to 190° C. in accordance with JIS C 3003, Methods of test for enamel wires, Section 7.Flexibility. Existence or non-existence of cracks in an enamel layer or an extrusion-coated resin layer after still standing for 1000 hours was checked visually. A sample in which troubles such as cracks were not able to be confirmed in the enamel layer and an extrusion-coated resin layer was judged to have met the passing level for the test criteria. Based on this criteria, a sample in which performance is excellent in particular because discoloration is very little and change of shape and cracks are strikingly absent was expressed as "⊙". A sample in which performance is excellent because none of change of shape and cracks is found although discoloration is found was expressed as "○". A sample in which the trouble was confirmed was judged to be failed to reach the passing level for the test criteria, and expressed as "x". Also note that "ND" in Table 4 means "not measured".

(Total Evaluation)

A sample in which all of the evaluations in each of the above-described tests were raked as "○" or "⊙", was judged to have met the passing level for the test criteria of the overall evaluation. More specifically, a particularly excellent sample having overall evaluation of "⊙" was expressed as "⊙", and an excellent sample having only evaluation of "○" was expressed as "○". A sample having even one evaluation of "x" in any of the above-described tests was judged to be failed to reach the passing the level for the test criteria of the overall evaluation, and expressed as "x".

TABLE 2

| | | | Level required | Ex. 1 | Ex. 2 | Ex. 3 | Ex. 4 | Ex. 5 | Ex. 6 | Ex. 7 |
|---|---|---|---|---|---|---|---|---|---|---|
| Combination | Backed enamel layer | | | PAI | PAI | PAI | PAI | PI | PAI | PI |
| | Thickness | (μm) | | 25 | 40 | 40 | 40 | 40 | 40 | 40 |
| | Extrusion-coated resin layer | | | PEEK | PEEK | PEEK | PEEK | PEEK | modified-PEEK | PEN |
| | Thickness | (μm) | | 26 | 103 | 150 | 160 | 108 | 105 | 100 |
| | Tensile elastic modulus (minimum) | (MPa) | | 350 | 350 | 350 | 350 | 350 | 220 | 220 |
| | Crystallinity | (%) | | 70 | 73 | 68 | 100 | 60 | 70 | 95 |
| | Total thickness | (μm) | | 51 | 143 | 190 | 200 | 148 | 145 | 140 |
| dielectric constant | Backed enamel layer ($\epsilon_1$) | 25° C. | | 3.9 | 3.9 | 3.9 | 3.9 | 3.5 | 3.9 | 3.5 |
| | Extrusion-coated resin layer ($\epsilon_2$) | | | 3.1 | 3.1 | 3.1 | 3.1 | 3.1 | 3.1 | 3.5 |
| | Entire insulting layer | | | 3.5 | 3.3 | 3.2 | 3.2 | 3.2 | 3.2 | 3.5 |
| | Backed enamel layer ($\epsilon_1'$) | 250° C. | | 4.4 | 4.4 | 4.4 | 4.4 | 4.0 | 4.4 | 4.0 |
| | Extrusion-coated resin layer ($\epsilon_2'$) | | | 4.7 | 4.7 | 4.7 | 4.7 | 4.7 | 4.7 | 4.3 |
| | Entire insulting layer | | | 4.5 | 4.6 | 4.7 | 4.7 | 4.5 | 4.6 | 4.2 |
| | Ratio of dielectric constant ($\epsilon_2'/\epsilon_1'$) | | | 1.1 | 1.1 | 1.1 | 1.1 | 1.2 | 1.1 | 1.1 |
| Wire Properties | Partial discharge-occurring voltage | 25° C. | 1 kVp | ○ | ○ | ○ | ○ | ○ | ○ | ○ |
| | | 250° C. | 50% or more with respect to one at 25° C. | ○ | ○ | ○ | ○ | ○ | ○ | ○ |
| | Dielectric breakdown voltage | 250° C. | 50% or more with respect to one at 25° C. | ○ | ○ | ○ | ○ | ○ | ○ | ○ |
| | Dielectric breakdown test after winding on iron core and heating | 250° C. | no cracks, no discoloration | ⊙ | ⊙ | ⊙ | ⊙ | ⊙ | ⊙ | ○ |
| | Thermal aging resistance property | 190° C. 1000 H | no cracks | ⊙ | ⊙ | ⊙ | ⊙ | ⊙ | ⊙ | ○ |
| | Total evaluation | | | ⊙ | ⊙ | ⊙ | ⊙ | ⊙ | ⊙ | ○ |

"Ex" means Example according to the present invention.

TABLE 3

|  |  |  | Level required | Ex. 8 | Ex. 9 | Ex. 10 |
|---|---|---|---|---|---|---|
| Combination | Backed enamel layer |  |  | PAI | PAI | PAI |
|  | Thickness | (μm) |  | 40 | 40 | 40 |
|  | Adhesive layer |  |  | PEI | PEI | PEI |
|  | Thickness |  |  | 3 | 6 | 6 |
|  | Extrusion-coated resin layer |  |  | PEEK | PEEK | PEEK |
|  | Thickness | (μm) |  | 103 | 150 | 160 |
|  | Tensile elastic modulus (minimum) | (MPa) |  | 350 | 350 | 350 |
|  | Crystallinity | (%) |  | 73 | 68 | 100 |
|  | Total thickness | (μm) |  | 146 | 196 | 206 |
| dielectric constant | Backed enamel layer ($\epsilon1$) | 25° C. |  | 3.9 | 3.9 | 3.9 |
|  | Extrusion-coated resin layer ($\epsilon2$) |  |  | 3.1 | 3.1 | 3.1 |
|  | Entire insulting layer |  |  | 3.2 | 3.2 | 3.2 |
|  | Backed enamel layer ($\epsilon1'$) | 250° C. |  | 4.4 | 4.4 | 4.4 |
|  | Extrusion-coated resin layer ($\epsilon2'$) |  |  | 4.7 | 4.7 | 4.7 |
|  | Entire insulting layer |  |  | 4.7 | 4.7 | 4.7 |
|  | Ratio of dielectric constant ($\epsilon2'/\epsilon1'$) |  |  | 1.1 | 1.1 | 1.1 |
| Wire Properties | Partial discharge-occurring voltage | 25° C. | 1 kVp | ○ | ○ | ○ |
|  |  | 250° C. | 50% or more with respect to one at 25° C. | ○ | ○ | ○ |
|  | Dielectric breakdown voltage | 250° C. | 50% or more with respect to one at 25° C. | ○ | ○ | ○ |
|  | Dielectric breakdown test after winding on iron core and heating | 250° C. | no cracks, no discoloration | ⊙ | ⊙ | ⊙ |
|  | Thermal aging resistance property | 190° C. 1000 H | no cracks | ⊙ | ⊙ | ⊙ |
|  | Total evaluation |  |  | ⊙ | ⊙ | ⊙ |

"Ex" means Example according to the present invention.

TABLE 4

|  |  |  | Level required | C Ex 1 | C Ex 2 | C Ex 3 | C Ex 4 | C Ex 5 | C Ex 6 | Reference example 1 |
|---|---|---|---|---|---|---|---|---|---|---|
| Combination | Backed enamel layer |  |  | PAI | PAI | PAI | PAI | PI | PAI | — |
|  | Thickness | (μm) |  | 25 | 25 | 40 | 40 | 40 | 40 | — |
|  | Extrusion-coated resin layer |  |  | PEEK | PA66 | PEEK | PEEK | PPS | PPS | PEEK |
|  | Thickness | (μm) |  | 20 | 28 | 185 | 212 | 146 | 185 | 52 |
|  | Tensile elastic modulus (minimum) | (MPa) |  | 350 | 130 | 25 | 350 | 170 | 20 | 350 |
|  | Crystallinity | (%) |  | 73 | 100 | 42 | 75 | 81 | 45 | 100 |
|  | Total thickness | (μm) |  | 45 | 53 | 225 | 252 | 186 | 225 | 52 |
| dielectric constant | Backed enamel layer ($\epsilon1$) | 25° C. |  | 3.9 | 3.9 | 3.9 | 3.9 | 3.9 | 3.9 | — |
|  | Extrusion-coated resin layer ($\epsilon2$) |  |  | 3.1 | 11 | 3.1 | 3.1 | 3.2 | 3.2 | 3.1 |
|  | Entire insulting layer |  |  | 3.5 | 5.8 | 3.2 | 3.2 | 3.3 | 3.3 | 3.1 |
|  | Backed enamel layer ($\epsilon1'$) | 250° C. |  | 4.4 | 4.4 | 4.4 | 4.4 | 4.4 | 4.4 | — |
|  | Extrusion-coated resin layer ($\epsilon2'$) |  |  | 4.7 | $2 \times 10^4$ | 4.7 | 4.7 | 3.7 | 3.7 | 4.7 |
|  | Entire insulting layer |  |  | 4.5 | 9.1 | 4.6 | 4.6 | 3.8 | 3.8 | 4.7 |
|  | Ratio of dielectric constant ($\epsilon2'/\epsilon1'$) |  |  | 1.1 | 4545 | 1.1 | 1.1 | 0.8 | 0.8 | — |
| Wire Properties | Partial discharge-occurring voltage | 25° C. | 1 kVp | x | x | ○ | ○ | ○ | ○ | ○ |
|  |  | 250° C. | 50% or more with respect to one at 25° C. | ND | x | ○ | ND | ○ | ○ | ○ |
|  | Dielectric breakdown voltage | 250° C. | 50% or more with respect to one at 25° C. | ○ | ND | ○ | ND | x | x | x |
|  | Dielectric breakdown test after winding on iron core and heating | 250° C. | no cracks, no discoloration | ⊙ | ND | x | x | ○ | x | ⊙ |
|  | Thermal aging resistance property | 190° C. 1000 H | no cracks | ⊙ | ND | ⊙ | ⊙ | ○ | ○ | ⊙ |
|  | Total evaluation |  |  | x | x | x | x | x | x | x |

"C Ex" means Comparative Example.

As shown in Tables 2 to 4, it was found that a partial discharge inception voltage is high, and both insulation property and thermal aging resistance property at a high temperature are also excellent, if a total thickness of the baked enamel layer and the extrusion-coated resin layer is 50 μm or more, a thickness of the baked enamel layer is 60 μm or less, a thickness of the extrusion-coated resin layer is 200 μm or less, the minimum of tensile elastic modulus of the extrusion-coated resin layer at a range of 25 to 250° C. is 100 MPa or more, a dielectric constant of an insulation layer having a combination of the baked enamel layer and the extrusion-coated resin layer is 3.5 or less at 25° C. and 5.0 or less at 250° C., and a ratio ($\epsilon2'/\epsilon1'$) of specific permittivities at 250° C. exceeds 1.

Specifically, from comparison between Example 1 and Comparative Example 1, it was found that if the total thickness of the baked enamel layer and the extrusion-coated resin layer is less than 50 μm, at least the partial discharge inception voltage at 25° C. falls short of 1 kVp.

From the results of Comparative Example 2, it was found that if the dielectric constant $\epsilon2$ at 25° C. of the thermoplastic resin for forming the extrusion-coated resin layer exceeds 3.5 and the dielectric constant $\epsilon2'$ at 250° C. exceeds 5.0, the partial discharge inception voltage at 25° C. falls short of 1 kVp although the total thickness is 50 μm or more, and in addition, a remarkable decrease in the partial discharge inception voltage is caused at a high temperature.

From comparison between Examples 2 to 6 and Comparative Example 3 and Comparative Example 4, it was found that in the case where the thickness of the extrusion-coated resin layer exceeds 200 μm, after winding the wire on an iron-core and heating it, shape-changed or whitened portions can be observed on a surface of the wire, and hence a decrease in insulation property is recognized and the insulation retention property before and after the working is inferior.

From the results of Examples 1 to 6, it was found that if PEEK is selected as a resin for forming the extrusion-coated resin layer, both the insulation property at a high temperature and the partial discharge inception voltage are improved more and in addition, the thermal aging resistance property of the insulated wire can be satisfied.

Besides, as shown in Reference Example 1, it can be said that from the fact that the insulation breakdown voltage at a high temperature is small without the enamel layer, the insulation property at the high temperature was improved by a combination of the extrusion-coated resin with the enamel layer specified in terms of thickness and total thickness, as well as dielectric constant.

From the results of Comparative Examples 5 and 6, it was found that if the ratio ($\in 2'/\in 1'$) of specific permittivities at 250° C. is 1 or less, decrease in insulation breakdown voltage is significant.

Further, from the results of Comparative Examples 3 and 6, it was found that in the case where the minimum of tensile elastic modulus of the extrusion-coated resin layer at a range of 25 to 250° C. is less than 100 MPa, after winding the wire on an iron-core and heating it, shape-changed portions are observed on a surface of the wire, and hence a decrease in mechanical properties is recognized and the insulation retention property before and after the working is inferior, which results in deterioration of the insulation property at a high temperature.

From the results of Examples 8 to 10, it was found that even in the case where an adhesive layer has been provided between the enamel layer and the extrusion-coated resin layer, both the insulation property at a high temperature and the thermal aging resistance property are also excellent.

INDUSTRIAL APPLICABILITY

The inverter surge-resistant insulated wire of the present invention has a high-partial discharge inception voltage and also is excellent in both the insulation property at a high temperature and the thermal aging resistance property, and therefore, can be used for an insulated wire in the field which requires withstanding voltage and heat resistance, for example, including a variety of electric/electronic devices as well as automobiles, specifically coils for electric devices such as inverter-related devices, high-speed switching devices, inverter motors and transformers, and space electric devices, aircraft electric devices, nuclear electric devices, energy electric devices, automotive electric devices and the like. In particular, it is suitable as winding wires for the driving motor of HV (hybrid vehicle) or EV (electric vehicle).

By the inverter surge-resistant insulated wire of the present invention, high-performance electric/electronic devices used for motors and transformers can be provided.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority on Patent Application No. 2013-020887 filed in Japan on Feb. 5, 2013, which is entirely herein incorporated by reference.

REFERENCE SIGNS LIST

1 conductor
2 baked enamel layer
3 extrusion-coated resin layer

The invention claimed is:

1. An inverter surge-resistant insulated wire, having at least one baked enamel layer around the outer periphery of a conductor, and an extrusion-coated resin layer at the outside of the baked enamel layer,
   wherein the extrusion-coated resin layer is a single layer, and a resin of the resin layer is a resin selected from polyether ether ketone, a thermoplastic polyimide, a polyamide having an aromatic ring, a polyester having an aromatic ring, and polyketone,
   wherein a total thickness of the baked enamel layer and the extrusion-coated resin layer is 50 μm or more, a thickness of the baked enamel layer is 50 μm or less, and a thickness of the extrusion-coated resin layer is 200 μm or less,
   wherein the minimum of tensile elastic modulus of the extrusion-coated resin layer at a range of 25 to 250° C. is 100 MPa or more and 400 MPa or less,
   wherein a dielectric constant of an insulation layer having a combination of the baked enamel layer and the extrusion-coated resin layer is 3.0 or more and 3.5 or less at 25° C. and 4.0 or more and 5.0 or less at 250° C., and
   wherein a relation between dielectric constant ($\in 1'$) of the baked enamel layer at 250° C. and dielectric constant ($\in 2'$) of the extrusion-coated resin layer at 250° C. satisfies $2.0 \geq (\in 2'/\in 1') > 1$.

2. The inverter surge-resistant insulated wire according to claim 1, wherein the extrusion-coated resin layer is a layer formed by polyether ether ketone.

3. The inverter surge-resistant insulated wire according to claim 1, wherein the conductor has a rectangular cross-section.

4. The inverter surge-resistant insulated wire according to claim 1, wherein the thickness of the backed enamel layer is 40 μm or less.

* * * * *